(12) United States Patent
Matsukawa et al.

(10) Patent No.: US 6,995,205 B2
(45) Date of Patent: Feb. 7, 2006

(54) RESIN COMPOSITION WITH HIGH THERMAL CONDUCTIVITY AND METHOD OF PRODUCING THE SAME

(75) Inventors: Kiyotaka Matsukawa, Neyagawa (JP); Kozo Ishihara, Neyagawa (JP); Tsuneo Kamiyahata, Neyagawa (JP); Yoshikazu Inada, Neyagawa (JP); Yasuyuki Agari, Osaka (JP); Masayuki Shimada, Sakai (JP)

(73) Assignees: Nippon Kagaku Yakin Co., Ltd., Osaka (JP); Osaka Municipal Government, Osaka (JP)

( * ) Notice: Subject to any disclaimer, the term of this patent is extended or adjusted under 35 U.S.C. 154(b) by 0 days.

(21) Appl. No.: 10/490,629

(22) PCT Filed: Aug. 27, 2002

(86) PCT No.: PCT/JP02/08625

§ 371 (c)(1),
(2), (4) Date: Mar. 25, 2004

(87) PCT Pub. No.: WO03/029352

PCT Pub. Date: Apr. 10, 2003

(65) Prior Publication Data
US 2004/0204526 A1 Oct. 14, 2004

(30) Foreign Application Priority Data
Sep. 27, 2001 (JP) .............................. 2001-296677

(51) Int. Cl.
*C08J 3/00* (2006.01)
*C08K 3/04* (2006.01)
*C08K 3/08* (2006.01)
*C08L 61/00* (2006.01)
*C08L 77/00* (2006.01)

(52) U.S. Cl. .................. 524/439; 310/43; 310/235; 310/272; 359/896; 523/215; 523/307; 524/440; 524/441; 524/495

(58) Field of Classification Search ................ 524/439, 524/440, 441, 495; 523/215, 307; 310/43, 310/235, 272; 359/896
See application file for complete search history.

(56) References Cited

U.S. PATENT DOCUMENTS 6,342,680 B1 * 1/2002 Nakagawa et al. ......... 174/257

FOREIGN PATENT DOCUMENTS

| JP | 6-196884 | 7/1994 |
| JP | 10-237331 | 9/1998 |
| JP | 11-255904 | 9/1999 |
| JP | 2000-357413 | * 12/2000 |
| JP | 2001-72775 | 3/2001 |
| JP | 2001-200163 | 7/2001 |
| JP | 2001-200225 A | 7/2001 |
| JP | 2002-212443 A | 7/2002 |

* cited by examiner

Primary Examiner—Patrick D. Niland
(74) Attorney, Agent, or Firm—Wenderoth, Lind & Ponack, L.L.P.

(57) ABSTRACT

A resin composition having high thermal conductivity and excellent moldability and a method of producing the same is provided. The composition includes 40 vol % or more of a matrix resin, 10 to 55 vol % of a thermally conductive filler dispersed in the matrix resin and the balance of a low-melting point alloy connecting the thermally conductive filler to each other and having a melting point not higher than 500° C. The proportion of the volume ratio of the low-melting point alloy to that of the thermally conductive filler is set in a range from 1/30 to 3/1.

13 Claims, 4 Drawing Sheets

RESIN COMPOSITION WITH HIGH THERMAL CONDUCTIVITY AND METHOD OF PRODUCING THE SAME

TECHNICAL FIELD

The present invention relates to a resin composition having a high thermal conductivity and excellent moldability.

BACKGROUND ART

As semiconductor devices such as LSI are made with increasingly higher degree of integration, their operating speeds become higher and electronic components are packaged with higher density, it has been increasingly important to dissipate heat generated in the electronic components. Casings for electronic components, for instance, have been made of metals or ceramics having high thermal conductivity, but resin-based materials have recently come into use that provide high degree of freedom in choosing the shape and ease of reducing the size.

For the resin-based material, such resin compositions have been used that comprise a matrix resin and a filler having high thermal conductivity, such as metal, alloy or ceramic, dispersed in the matrix resin.

A composite material having a part of resin replaced with a low-melting point alloy has also been proposed (Japanese Laid-open Patent Publication No. 6-196884). This publication describes that thermal conductivity of molded parts can be increased by molding a mixed powder containing a resin, a low-melting point alloy and a filler at the room temperature, and heating the preform at a temperature at which the low-melting point alloy completely melts so that the filler particles are fixed by the low-melting point alloy for connecting to each other.

DISCLOSURE OF INVENTION

However, application of the method disclosed in the above Japanese Laid-open Patent Publication No. 6-196884 to molding of the resin brings such problems as described below. When the low-melting point alloy is heated to a temperature at which the low-melting point alloy completely melts and is kneaded with the resin, it has been difficult to uniformly disperse the low-melting point alloy in the resin because viscosity is significantly different between the low-melting point alloy and the resin. Also because resin content decreases as the content of the low-melting point alloy is increased so as to connect the filler particles to each other, flexibility, impact resistance and moldability of the resin are deteriorated. Also because it is necessary to include a high content of the low-melting point alloy that has a lower thermal conductivity than that of the filler, it is difficult to achieve a high thermal conductivity of the resultant resin composition.

An object of the present invention is to solve the problems described above, and provide a resin composition and a method of producing the same, the resin composition having a high thermal conductivity and excellent moldability.

The present inventors have found that it is made easier to disperse the low-melting point alloy in the resin by bringing the low-melting point alloy into semi-molten state wherein solid phase and liquid phase coexist, thereby to reduce the influence of the difference in viscosity between the low-melting point alloy and the resin. Thus, the present invention has been completed. The resin composition having high thermal conductivity of the present invention comprises 40 vol % or more of a matrix resin, 10 to 55 vol % of a thermally conductive filler dispersed in the matrix resin and the balance of a low-melting point alloy connecting the thermally conductive filler to each other and has a melting point not higher than 500° C., wherein the proportion of the volume ratio of the low-melting point alloy to that of the thermally conductive filler is in a range from 1/30 to 3/1.

The resin composition of the present invention is obtained by heating the low-melting point alloy to a temperature at which it is turned into a semi-molten state, and kneading the powder mixture of the low-melting point alloy, the thermally conductive filler and the resin. Since viscosity of the low-melting point alloy is controlled to be higher than that of completely molten state by keeping the low-melting point alloy in the semi-molten state so as to minimize the difference in viscosity between the low-melting point alloy and the resin, the low-melting point alloy can be better dispersed in the resin. As a result, such a resin composition is obtained as the low-melting point alloy is dispersed more uniformly in the resin compared to a case where the low-melting point alloy is kneaded in completely molten state. The low-melting point alloy makes contact with or deposits to the thermally conductive filler so as to connect the thermally conductive filler to each other and thereby to form 3-dimensional paths for heat transfer. The low-melting point alloy dispersed uniformly in the resin binds the particles of the thermally conductive filler with less volume ratio than in the prior art, and forms the paths for heat transfer that are more uniformly distributed in the 3-dimensional space. Thus it is made possible to provide a resin composition that has a high thermal conductivity where volume ratio of the matrix resin is set to 40 vol % or higher so as to maintain satisfactory moldability. The resin composition of the present invention achieves thermal conductivity of 5 W/m·K or higher which is difficult to achieve with the thermally conductive composition of the prior art that contains metal, alloy or ceramics.

The low-melting point alloy used in the resin composition of the present invention may be at least one alloy selected from the group consisting of Sn—Cu, Sn—Al, Sn—Zn, Sn—Pt, Sn—Mn, Sn—Mg, Sn—Ag, Sn—Au, Al—Li and Zn—Li.

At least copper powder and graphite powder may be used as the thermally conductive filler of the resin composition of the present invention.

The thermally conductive filler used in the resin composition of the present invention may include 5 to 15 vol % of carbon fiber in proportion to the resin composition. The carbon fiber having thermal conductivity of 100 W/m·K or higher may be used.

A heat resistant resin having deflection temperature of 100° C. or higher under load may be used as the matrix resin of the resin composition of the present invention.

The resin composition having high thermal conductivity of the present invention can be produced by a process described below. A powder mixture including the matrix resin, the thermally conductive filler and the low-melting point alloy having melting point not higher than 500° C. is heated so as to bring the low-melting point alloy into semi-molten state wherein-solid phase and liquid phase coexist thereby to knead the low-melting point alloy and the matrix resin that is completely melted, and the mixture is molded into a desired shape.

According to the method of producing of the present invention, a powder mixture including 40 vol % or more of the matrix resin, 10 to 55 vol % of the thermally conductive filler and the balance of the low-melting point alloy may be used.

Also according to the method of producing of the present invention, proportion of the volume ratio of the low-melting point alloy to that of the thermally conductive filler can be set in a range from 1/30 to 3/1.

Also according to the method of producing of the present invention, the thermally conductive filler may include 5 to 15 vol % of carbon fiber.

An optical pickup base used for the optical pickup for various optical disk drive device such as CD-ROM drive can be produced by molding the resin composition having high thermal conductivity of the present invention to shape by dies. The optical pickup base of the present invention is made of the resin composition that comprises 40 vol % or more of the matrix resin, 10 to 55 vol % of the thermally conductive filler dispersed in the matrix resin and the balance of the low-melting point alloy connecting the thermally conductive filler to each other and having a melting point not higher than 500° C., wherein proportion of the volume ratio of the low-melting point alloy to that of the thermally conductive filler is set in a range from 1/30 to 3/1, and has thermal conductivity of 5 W/m·K or higher.

A casing for a fan with a built-in motor (hereinafter referred to as the fan motor) used for cooling electronic components can be produced by using the resin composition having high thermal conductivity of the present invention. The fan motor casing of the present invention is made of the resin composition that comprises 40 vol % or more of the matrix resin, 10 to 55 vol % of the thermally conductive filler dispersed in the matrix resin and the balance of the low-melting point alloy connecting the thermally conductive filler to each other and having a melting point not higher than 500° C., wherein proportion of the volume ratio of the low-melting point alloy to that of the thermally conductive filler is set in a range from 1/30 to 3/1, and has thermal conductivity of 5 W/m·K or higher.

BEST MODE FOR CARRYING OUT THE INVENTION

Preferred embodiments of the present invention will be described below.

The resin composition of the present invention can be made by heating a powder mixture including a matrix resin, a thermally conductive filler and a low-melting point alloy having melting point not higher than 500° C. to a temperature at which the matrix resin is melted and the low-melting point alloy is turned into semi-molten state wherein solid phase and liquid phase coexist, and kneading the mixture.

The matrix resin used in the present invention is a thermoplastic or thermosetting resin, which is a heat-resistant resin and has a deflection temperature of 100° C. or higher under load as defined in JIS K7191. Specific examples of the thermoplastic resin include polyphenylene sulfide (PPS), liquid crystal polymer, polyether ether ketone (PEEK), polyimide, polyether imide, polyacetal, polyether sulfone, polysulfone, polycarbonate, polyethylene terephthalate, polybutylene terephthalate, polyphenylene oxide, polyphthalamide, and polyamide, and specific examples of the thermosetting resin include phenol resin, epoxy resin, unsaturated polyester resin, diallyl phthalate resin, melamine resin, and urea resin. Among these resins, PPS is more preferable. The reason is as follows. Since PPS has low viscosity upon melting, fillers are easily dispersed and thus a large amount of the fillers can be incorporated. Since PPS has high heat resistance, it is made possible to increase the degree of freedom in the selection of the low-melting point alloy.

In case of the thermoplastic resin, it is kneaded with the low-melting point alloy and the fillers while heating at its melting point thereof, preferably 250 to 400° C., and more preferably 300 to 350° C. In case of the thermosetting resin, it can be kneaded at a temperature lower than its decomposition temperature, and preferably 300° C. or lower.

The volume ratio of the resin is preferably 40 vol % or higher so as to ensure good moldability.

The low-melting point alloy used in the present invention is preferably one that turns into semi-molten state at the melting point of the heat resistant resin described above, and may be an alloy having melting point (liquidus temperature) not higher than 500° C. Specifically, Sn based alloys such as Sn—Cu, Sn—Al, Sn—Zn, Sn—Te, Sn—Pt, Sn—P, Sn—Mn, Sn—Ag, Sn—Ca, Sn—Mg, Sn—Au, Sn—Ba and Sn—Ge and Li based alloys such as Al—Li, Cu—Li and Zn—Li may be used. More preferably, alloys having liquidus temperature not higher than 400° C., namely at least one alloy selected from the group consisting of Sn—Cu, Sn—Al, Sn—Zn, Sn—Pt, Sn—Mn, Sn—Ag, Sn—Au, Al—Li and Zn—Li may be used. Use of such alloys makes it possible to increase the degree of freedom in the selection of resin. More preferably, at least one alloy selected from the group consisting of Sn—Cu, Sn—Al and Sn—Zn may be used, since these alloys are readily available at low cost. Further more preferably, Sn—Cu may be used that provides broader choice of melting point and high thermal conductivity.

The proportion of the volume ratio of the low-melting point alloy to that of the thermally conductive filler is preferably set in a range from 1/30 to 3/1, more preferably from 1/30 to 1/1, and most preferably from 1/30 to 5/7. When the proportion is less than 1/30, content of the low-melting point alloy connecting the thermally conductive filler to each other becomes insufficient and results in lower thermal conductivity of the resin composition. When the proportion is more than 3/1, content of the low-melting point alloy that has lower thermal conductivity than the thermally conductive filler increases and results in lower thermal conductivity of the resin composition.

The particle size of the low-melting point alloy is preferably 5 mm or less. When the particle size is more than 5 mm, it takes longer time to melt and is difficult to uniformly disperse in the matrix resin.

The thermally conductive filler may be either in the form of powder or fiber. As the filler in the form of powder, metal powder such as iron, copper, tin, nickel, aluminum, magnesium, titanium, chromium, zinc, gold, silver, etc., ceramic powder such as aluminum oxide, magnesium oxide, boron nitride, aluminum nitride, silicon nitride, etc. or graphite powder may be used. One or more kinds of such powdery fillers may be included in the resin composition. It is particularly preferable to include copper powder and graphite powder in the resin composition. In this case, copper powder and graphite powder may be added separately to the raw powder or, alternatively, compound powder of copper and graphite may be added to the raw powder when preparing the powder mixture of the resin composition.

The compound powder of copper and graphite may be made either by coating graphite powder with copper via solder or the like, or by coating graphite powder with copper by electroplating or electroless plating, or combining graphite powder and copper powder by mechanical alloying. Particle size of the compound powder of copper and graphite is from 1 to 150 $\mu$m, and preferably from 25 to 100 $\mu$m. This is because powder having particle size less than 1 $\mu$m or more than 150 $\mu$m is difficult to disperse in the matrix resin.

Use of the compound powder of copper and graphite has the following advantages. Copper powder has higher thermal conductivity than other metals, but is high in specific gravity. A powder having lower specific gravity and high thermal conductivity can be made by combining copper powder with graphite that has lower specific gravity. Even when copper is oxidized, graphite is hard to be oxidized and therefore the decrease in thermal conductivity of the composite powder can be minimized. Moreover, graphite powder plated with copper is less subject to the influence of the ductility of copper, since copper is included in the form of plating film. As a result, copper undergoes less deformation during injection molding process, thus having an effect of reducing the torque generated during molding.

While the fibrous filler may be a metallic fiber made of any of the metals described above, ceramic fiber such as glass fiber, alumina fiber, calcium titanate fiber or silicone nitride fiber or carbon fiber, it is preferable to use carbon fiber having high thermal conductivity.

The volume ratio of the thermally conductive filler to the resin composition is in a range from 10 to 55 vol %, preferably from 15 to 45 vol % and more preferably from 15 to 40 vol %. This is because thermal conductivity decreases when the volume ratio is lower than 10 vol % and moldability of the resin composition deteriorates when the volume ratio is higher than 55 vol %. In case two kinds of thermally conductive filler, namely copper powder and graphite powder, are used, volume ratio of graphite powder is preferably in a range from 5 to 40 vol %.

The carbon fiber that constitutes the thermally conductive filler may include the carbon fibers produced from the raw material, such as cellulose, PAN or pitch, or produced by vapor phase deposition. Some carbon fibers have higher thermal conductivity than an inorganic filler made of a metal or a metal oxide. However, while the carbon fiber shows a high thermal conductivity in the longer direction of the fiber, it shows insufficient heat dissipation. For this reason, carbon fiber is used in combination with an inorganic filler so that particles of the inorganic filler are connected via the carbon fiber thereby to form the 3 dimensional paths for heat transfer. As a result, heat dissipation property of the resin composition is improved. It needs not to say that carbon fibers are connected to each other by the low-melting point alloy so as to form the 3-dimensional paths for heat transfer, thus achieving the effect of improving heat dissipation property of the resin composition.

Thermal conductivity of the carbon fiber in the longer direction of the fiber is 100 W/m·K or higher, and preferably 700 W/m·K or higher.

The diameter of the carbon fiber is in a range from 1 to 35 $\mu$m, preferably from 5 to 20 $\mu$m and the length thereof is preferably in a range from 5 to 100 $\mu$m and more preferably from 20 to 80 $\mu$m. This is because the carbon fiber less than 1 $\mu$m in diameter behaves like fine powder and is difficult to handle, while carbon fiber larger than 35 $\mu$m in diameter tends to break when being kneaded with the resin.

The volume ratio of the carbon fiber to the resin composition is in a range from 1 to 20 vol %, preferably from 5 to 15 vol % and more preferably from 5 to 10 vol %. This is because satisfactory thermal conductivity cannot be achieved when the volume ratio is lower than 1 vol % and moldability of the resin composition deteriorates when the volume ratio is higher than 20 vol %.

When the carbon fiber is not used in the thermally conductive filler, the resin composition of the present invention preferably includes 50 vol % of the matrix resin, 10 to 40 vol % of the thermally conductive filler and the balance of the low-melting point alloy, while the proportion of volume ratio of the low-melting point alloy to that of the thermally conductive filler is in a range from 1/30 to 3/1.

When the carbon fiber is used in the thermally conductive filler, the resin composition of the present invention preferably includes 50 vol % of the matrix resin, 5 to 25 vol % of the thermally conductive filler other than carbon fiber, 5 to 15 vol % of carbon fiber and the balance of the low-melting point alloy, while proportion of volume ratio of the low-melting point alloy to that of the thermally conductive filler is set in a range from 1/30 to 3/1.

The surface of the thermally conductive filler may be modified by means of a coupling agent or a sizing agent. Rendering the affinity for the matrix resin to the filler improves the dispersing characteristic of the thermally conductive filler in the matrix resin, and thereby to improve the thermal conductivity further. The coupling agents such as based on silane, titanium and aluminum can be used. For example, isopropyltriisostearoyl titanate and acetalkoxyaluminum diisopropylate may be used for metal powder. Epoxy resin, urethane-modified epoxy resin, polyurethane resin and polyamide resin may be used as the sizing agent for carbon fiber. Modification can be achieved by such a process as immersing the thermally conductive filler in a solution prepared by dissolving the coupling agent in water or an organic solvent for a predetermined period of time, or spraying a solution of the coupling agent onto the thermally conductive filler.

The resin composition of the present invention can be molded in a desired shape by mixing the raw powders in predetermined proportions, kneading the mixture and processing it in an injection molding machine, a compression molding machine, an extrusion molding machine or the like that is provided with a predetermined mold.

The resin composition of the present invention, having excellent moldability and high thermal conductivity as described above, can be applied to casings of electronic components and heat sink or fan for dissipating heat from electronic components. The resin composition can be preferably applied to, for example, heat dissipating optical pickup base that houses a semiconductor laser of an optical pickup, packaging material or heat sink of semiconductor device, casing of fan motor, casing of motor core, casing of secondary battery, housing of computer or mobile phone or the like.

Figure 1:
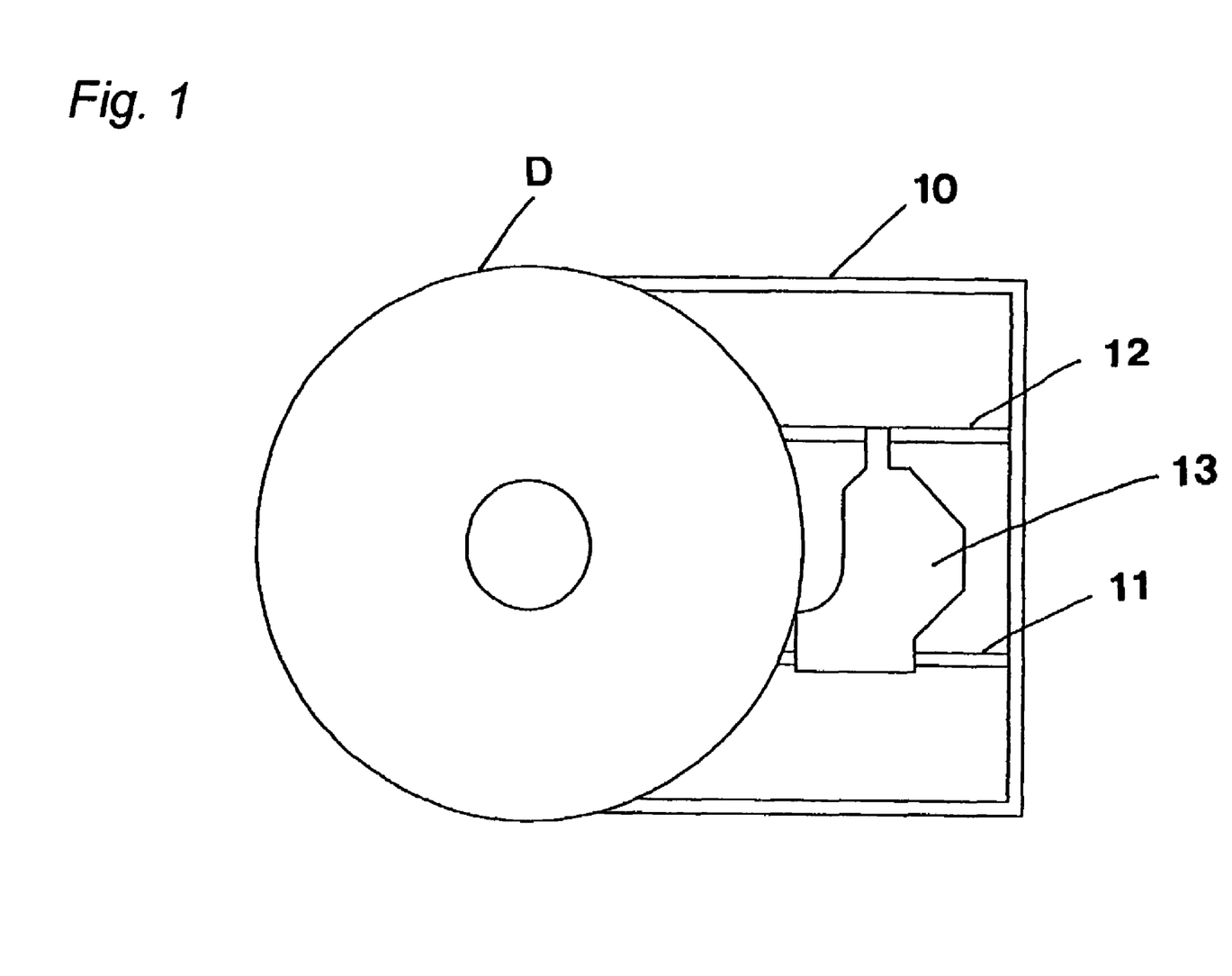
FIG. 1 is a schematic diagram showing an example of the structure of an optical disk drive device that uses the optical pickup base produced by using a resin composition of the present invention.

FIG. 1 is a schematic diagram showing an example of the structure of optical disk drive device that uses the optical pickup base made of a resin composition of the present invention. The optical disk drive device includes a chassis 10, a main shaft 11 and an auxiliary shaft 12 attached to the chassis 10, and an optical pickup 13 attached sidably to the main shaft 11 and the auxiliary shaft 12. The optical pickup 13 is moved in the radial direction of an optical disk D along the main shaft 11 and the auxiliary shaft 12 by a drive motor (not shown) that is controlled by a control system (not shown), so as to record and read information.

Figure 2:
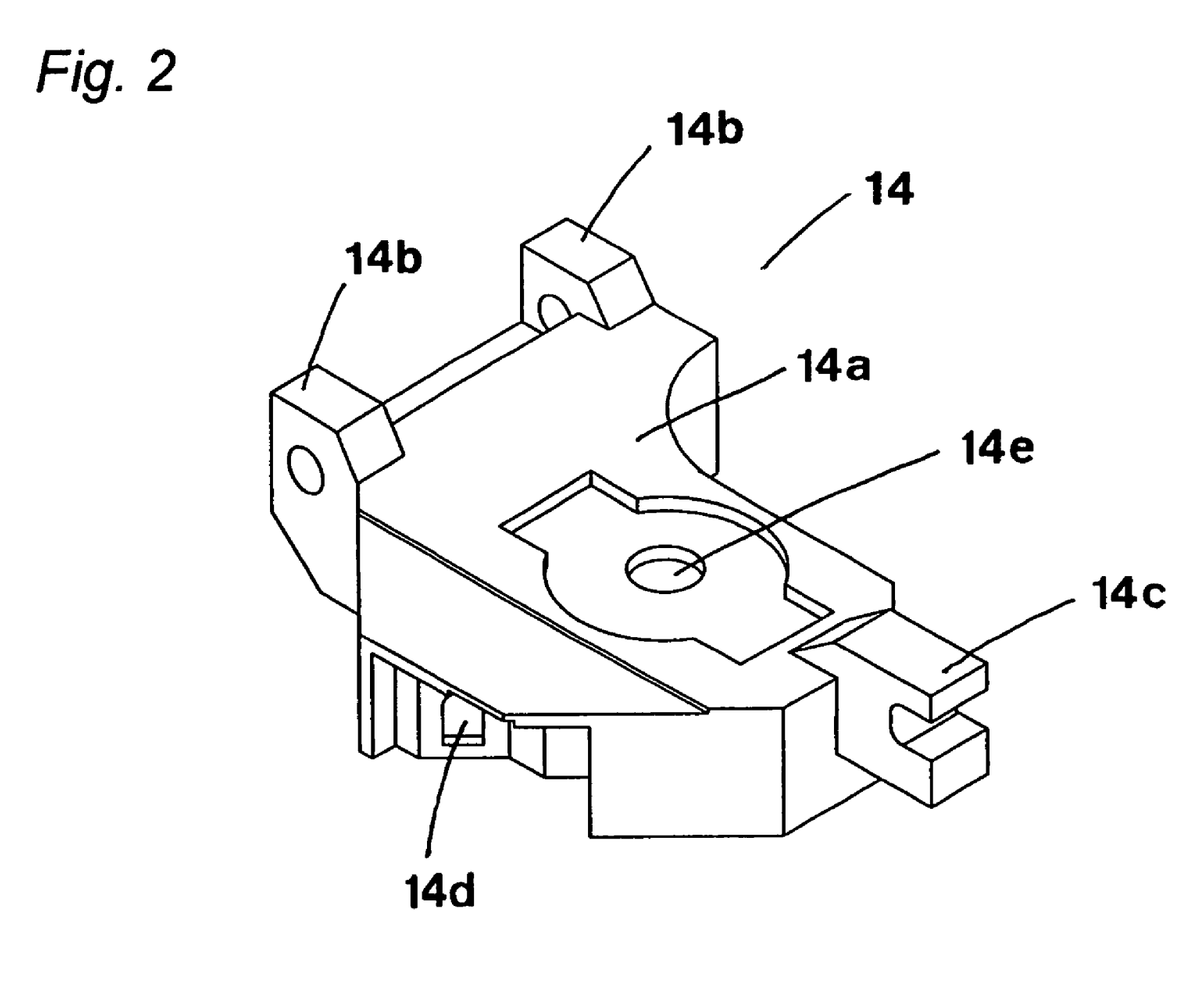
FIG. 2 is a perspective view schematically showing an example of the structure of the optical pickup base produced by using a resin composition of the present invention.

The optical pickup 13 includes an optical pickup base 14 shown in FIG. 2 and a laser diode (not shown) attached to a laser diode holder (not shown). The optical pickup base 14 includes a base body 14a, two main bearings 14b, 14b that are formed integrally with the base body 14a with a predetermined space from each other at one end of the base body 14a, and an auxiliary bearing 14c formed integrally with the base body 14a at the other end of the base body 14a. The main shaft 11 and the auxiliary shaft 12 are movably inserted into the main bearings 14b, 14b and the auxiliary bearing 14c. The laser diode holder is attached to a mounting portion 14d for the laser diode holder. Light emitted from the laser diode is reflected on an optical element that is not shown, so as to be directed toward the optical disk D at right angles, and emitted from an emission hole 14e formed in the base body 14a toward the optical disk D.

The optical pickup base made of the resin composition of the present invention is lighter in weight than a metallic optical pickup base of the prior art and, not only allows access to an optical disk at a higher speed but also has a high thermal conductivity of 5 W/m·K or higher, so as to provide sufficient heat dissipation to deprive the laser diode of heat.

Figure 3:
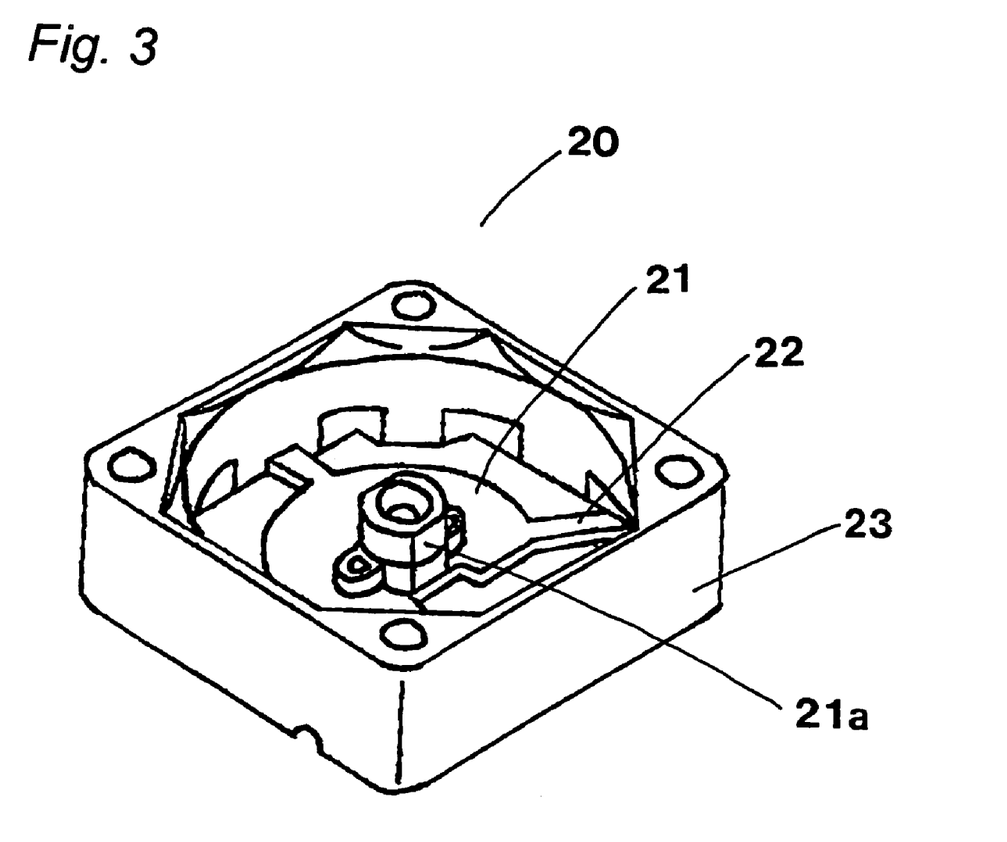
FIG. 3 is a perspective view schematically showing an example of the structure of a fan motor casing produced by using a resin composition of the present invention.

FIG. 3 is a schematic diagram showing an example of the structure of the fan motor casing made of a resin composition of the present invention. A fan motor casing 20 includes a fan support portion 21 that rotatably supports a fan (not shown) driven by a motor (not shown) and a frame 23 that is connected to the fan support portion 21 by a connecting member 22 and secures the fan support portion 21. The fan support portion 21 is provided with a bearing 21a that pivotally supports a shaft (not shown) which is formed integrally with the fan.

The fan motor casing made of the resin composition of the present invention is lighter in weight than a metallic fan motor casing of the prior art and, not only provides a light fan motor but also has a high thermal conductivity of 5 W/m·K or higher, so as to provide sufficient heat dissipation property to deprive the heat of the fan motor.

The present invention will be described below by way of examples.

EXAMPLE 1

(Sample Preparation)

Polyphenylene sulfide (PPS) was used as the matrix resin, either a combination of copper powder and graphite powder or a compound powder of copper and graphite (mean particle size 62 μm with ratio of copper to graphite 1:1 (weight ratio)) and pitch-based carbon fiber (mean diameter 10.5 μm, mean fiber length 59 μm) were used as the thermally conductive filler, and Sn—Al alloy powder (mean particle size 10.3 μm) or Sn—Cu alloy powder (mean particle size 15.5 μm) was used for the low-melting point alloy.

A powder mixture of composition shown in Table 1 was charged into an extrusion kneading machine, where the mixture was mixed and kneaded at a temperature of 315 to 335° C. and was extruded in the form of pellets. The pellets were molded by a hot press to make samples of cylindrical shape measuring 50 mm in diameter and 5 mm in thickness for the measurement of thermal conductivity.

For the alloy, content was set to 2 to 30% for Sn—Al alloy and 4 to 30% for Cu—Sn in order to keep the alloy in semi-molten state when being kneaded with the resin.

Comparative samples for the measurement of thermal conductivity were made in a process similar to that described above by using a compound powder of copper and graphite (Gr) for the filler without containing the low-melting point alloy (samples 5, 6), using a copper powder for the filler (sample 7), using the low-melting point alloy and copper powder for the filler (sample 11), using thermally conductive resin composition A (PPS/Al=49/51 vol %) (sample 8), using a thermally conductive resin composition B (PPS/Al/CF=50/40/10 vol %) (sample 9) and using a thermally conductive resin composition C (PPS/Gr/CF=55/35/10 vol %) (sample 10).

TABLE 1

| | | Raw material/Volume ratios of components (vol %) | | | Low-melting point alloy/thermally |
| --- | --- | --- | --- | --- | --- |
| | | Low-melting | Thermally conductive filler | | conductive filler |
| Sample | Resin | point alloy | Inorganic powder | Carbon fiber | (volume ratio) |
| 1 | PPS/55.7 | Sn—Cu/4.3 | Cu—Gr/40.0 | None | 0.11 |
| 2 | PPS/47.1 | Sn—Al/4.3 | Cu—Gr/40.0 | CF/8.6 | 0.088 |
| 3 | PPS/47.1 | Sn—Cu/4.3 | Cu—Gr/40.0 | CF/8.6 | 0.088 |
| 4 | PPS/45.0 | Sn—Cu/18.0 | Cu—Gr/28.0 | CF/9.0 | 0.49 |
| 5 | PPS/60 | None | Cu—Gr/40.0 | None | None |
| 6 | PPS/39.2 | None | Cu—Gr/60.8 | None | None |
| 7 | PPS/70 | None | Cu/30 | None | None |
| 8 | PPS/49 | None | Al/51 | None | None |
| 9 | PPS/50 | None | Al/40 | CF/10 | None |
| 10 | PPS/55 | None | Gr/35 | CF/10 | None |
| 11 | PPS/50 | Sn—Cu/45 | Cu/5 | None | 9 |
| 12 | PPS/55.7 | Sn—Cu/4.3 | Cu/8 Gr/32 | None | 0.11 |

(Measurement of Thermal Conductivity)

Figure 4:
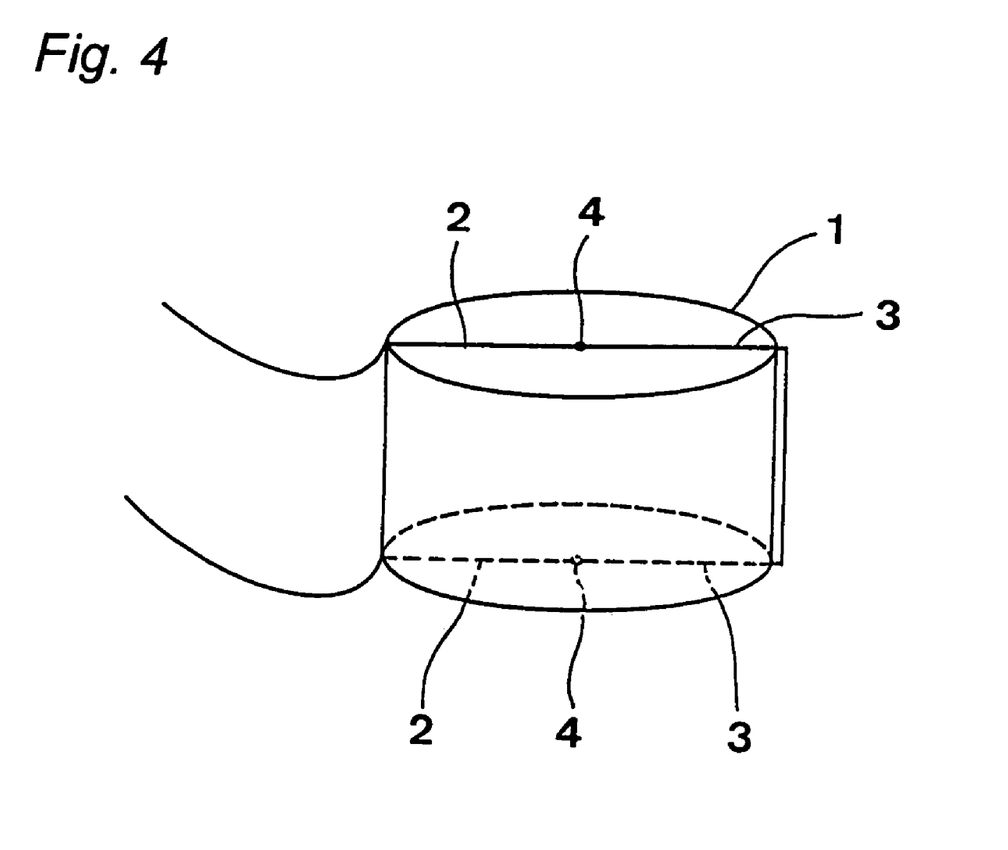
FIG. 4 is a perspective view schematically showing a method of measuring thermal conductivity of a resin composition of the present invention.

A thermal conduction meter (model TCHM-DV) produced by DYNATECH R&D Corp. was used. CC (copper-constantan) thermocouples were embedded in the top and bottom surfaces of the disc shaped sample by hot press as shown in FIG. 4, in order to monitor precisely the temperature difference between the surfaces during measurement. Hot press process enables it to improve the flatness of the sample and decrease contact resistance between the sample and the thermocouple. Measurement was made after keeping the sample at a predetermined temperature for one hour in order to stabilize the heat transfer. Measured values of thermal conductivity are shown in Table 2.

TABLE 2

| Sample | Thermal conductivity (W/m · K) |
|---|---|
| 1 | 14.93 |
| 2 | 12.01 |
| 3 | 17.60 |
| 4 | 23.92 |
| 5 | 1.12 |
| 6 | 4.63 |
| 7 | 0.61 |
| 8 | 2.55 |
| 9 | 2.05 |
| 10 | 1.65 |
| 11 | 3.29 |
| 12 | 14.48 |

Samples including a filler made of the compound powder of copper and graphite showed low thermal conductivity of lower than 5 W/m·K, when the Sn—Cu alloy of the low-melting point alloy (samples 5, 6) was not added. Sample 7 including filler made of Cu powder and sample 8 comprising filler made of Al powder also showed low thermal conductivity similarly to samples 5, 6.

Addition of the Sn—Cu alloy greatly increased the thermal conductivity to 14.93 W/m·K (sample 1).

Improvement of the thermal conductivity could not be achieved by the use of Cu powder, Al powder or the compound powder of copper and graphite that have high thermal conductivity in the filler unless Sn—Cu alloy was added.

Addition of the low-melting point alloy and use of carbon fiber for the filler resulted in further improvement of thermal conductivity to 17.60 W/m·K (sample 3). Use of Sn—Al alloy as the low-melting point alloy also resulted in high thermal conductivity of 12.01 W/m·K (sample 2). When the low-melting point alloy was not included, in contrast, thermal conductivity was as low as 2 W/m·K even if carbon fiber was used for the filler (samples 9, 10).

Increasing the volume ratio of the Sn—Cu alloy resulted in an increase in thermal conductivity (sample 4). However, excessively high volume ratio of Sn—Cu alloy leads to a decrease in thermal conductivity. For example, sample 11, wherein volume ratio of Sn—Cu alloy was 45 vol %, the volume ratio of copper of the filler was 5 vol % and the proportion of the volume ratio of Sn—Cu alloy to that of the filler was 9, showed thermal conductivity as low as about 3 W/m·K.

Use of copper powder and graphite powder for the thermally conductive filler resulted in high thermal conductivity. In this case, copper powder and graphite powder may be added separately (method of addition A), or the compound powder of copper and graphite may be added to the feed stock powder (method addition B). High thermal conductivity of about 14 W/m·K was achieved with both sample 12 which employed the method of addition A and sample 1 which employed the method of addition B. Volume ratios of copper powder and graphite powder in sample 12 were made equal to the volume ratios of copper powder and graphite powder that constituted the compound powder of copper and graphite.

With this example, thermal conductivity of 5 W/m·K or higher could be easily achieved which is difficult to achieve with the thermally conductive composition of the prior art that contains only metal powder. Moreover, thermal conductivity of 10 W/m·K or higher could be achieved.

While this example employed one kind of low-melting point alloy, a result similar to that of this example can be achieved also by combining two or more kinds of low-melting point alloy.

EXAMPLE 2

(Fabrication of Optical Pickup Base)

A mixture of feed stock powders having the proportions of sample 4 shown in Table 1 was charged into a kneading extruding machine, to be mixed and kneaded at a temperature of 315 to 335° C. and was extruded in the form of pellets. The pellets were charged into an injection molding machine and injection-molded at a temperature of 315 to 335° C. to make an optical pickup base having the shape shown in FIG. 3.

In this example, the optical pickup base lighter in weight than those of the prior art made of metals such as aluminum or magnesium die-cast and having higher thermal conductivity than that of molding of resin including metal powder, 5 W/m·K or higher, was obtained.

EXAMPLE 3

(Fabrication of Fan Motor Casing)

A mixture of feed stock powders having the proportions of sample 4 shown in Table 1 was charged into a kneading extruding machine, to be mixed and kneaded at a temperature of 315 to 335° C. and was extruded in the form of pellets. The pellets were charged into an injection molding machine and was injection-molded at a temperature of 315 to 335° C. to make a fan motor casing having the shape shown in FIG. 4.

In this example, the fan motor casing lighter in weight than those of the prior art made of metals such as aluminum or magnesium die-cast and having higher thermal conductivity than that of molding of resin including metal powder, 5 W/m·K or higher, was obtained.

While the optical pickup base and the fan motor casing, respectively, were made by using the resin composition of the present invention in examples 2 and 3, packaging material or heat sink for semiconductor devices, casing of motor core, casing of secondary battery, housing of computer or mobile phone or the like can also be produced by a method similar to that of example 2.

As will be clearly seen from the foregoing description, since the resin composition having high thermal conductivity of the present invention includes 40 vol % or more of the matrix resin, 10 to 55 vol % of the thermally conductive filler and the balance of the low-melting point alloy connecting the thermally conductive filler to each other and having a melting point not higher than 500° C., wherein proportion of the volume ratio of the low-melting point alloy to that of the thermally conductive filler is set in a range from 1/30 to 3/1, it is made possible to provide the resin composition having an excellent moldability and high thermal conductivity.

Thermal conductivity can be improved further as the thermally conductive filler includes carbon fiber in a proportion of 5 to 15 vol % of the resin composition, and carbon fiber having a thermal conductivity of 100 W/m·K or higher is used.

Also because the heat resistant resin having a deflection temperature of 100° C. or higher under load is used as the matrix resin, the low-melting point alloy in semi-molten state and the heat resistant resin in molten state can be kneaded with each other, thus making it easier to disperse the low-melting point alloy in the heat resistant resin.

According to the method of producing the resin composition having high thermal conductivity of the present invention, since the low-melting point alloy and the resin are heated to such a temperature as the low-melting point alloy is turned in semi-molten state where solid phase and liquid phase coexist and the matrix resin is melted during kneading, it is made easier to disperse the low-melting point alloy uniformly in the resin.

The optical pickup base made by using the resin composition having high thermal conductivity of the present invention has a high thermal conductivity, and provides heat dissipation performance that is high enough to maintain the light emitting property of a light emitting element such as laser. It is also lighter in weight than those made of metals and can be moved at a higher speed, thus making it possible to greatly improve the speed of access to optical disks.

The fan motor casing made by using the resin composition having high thermal conductivity of the present invention can provide a light fan motor that has heat dissipation performance which is high enough to deprive the fan motor of heat generated therefrom.

The invention claimed is:

1. A resin composition having high thermal conductivity comprising 40 vol % or more of a matrix resin, 10 to 55 vol % of a thermally conductive filler dispersed in the matrix resin and the balance of a low-melting point alloy connecting the thermally conductive filler to each other and having a melting point not higher than 500° C., wherein the proportion of the volume ratio of the low-melting point alloy to that of the thermally conductive filler is in a range from 1/30 to 3/1, and wherein the thermally conductive filler comprises at least a copper powder and graphite powder.

2. The composition according to claim 1, wherein the low-melting point alloy is at least one selected from the group consisting of Sn—Cu, Sn—Al, Sn—Zn, Sn—Pt, Sn—Mn, Sn—Mg, Sn—Ag, Sn—Au, Al—Li and Zn—Li.

3. The composition according to claim 1, wherein the thermally conductive filler further comprises 5 to 15 vol % of a carbon fiber.

4. The composition according to claim 3, wherein the carbon fiber has a thermal conductivity of 100 W/m·K or higher.

5. The composition according to claim 1, wherein the matrix resin comprises a heat resistant resin having a deflection temperature of 100° C. or higher under load.

6. The composition according to claim 1, wherein the composition has a thermal conductivity of 5 W/m·K or higher.

7. A method of producing a resin composition having high thermal conductivity, comprising:
heating a powder mixture including a matrix resin, a thermally conductive filler and a low-melting point alloy having a melting point not higher than 500° C. so as to bring the low-melting point alloy into semi-molten state in which a solid phase and liquid phase coexist, said powder mixture comprising 40 vol % or more of the matrix resin, 10 to 55 vol % of the thermally conductive filler comprising at least a copper powder and graphite powder, and the balance of the low-melting point alloy;
kneading the mixture in a condition which the matrix resin is completely melted; and
molding the mixture into a desired shape.

8. The method according to claim 7, wherein a proportion of the volume ratio of the low-melting point alloy to that of the thermally conductive filler is in a range from 1/30 to 3/1.

9. The method according to claim 7, wherein the thermally conductive filler comprises 5 to 15 vol % of carbon fiber.

10. An optical pickup base formed from a resin composition, said resin composition comprising 40 vol % or more of a matrix resin, 10 to 55 vol % of a thermally conductive filler comprising at least a copper powder and graphite powder and dispersed in the matrix resin and the balance of a low-melting point alloy connecting the thermally conductive filler to each other and having a melting point not higher than 500° C., the proportion of the volume ratio of the low-melting point alloy to that of the thermally conductive filler being in a range from 1/30 to 3/1.

11. The optical pickup base according to claim 10, wherein the optical pickup base has a thermal conductivity of 5 W/m·K or higher.

12. A casing for a fan motor formed from a resin composition, said resin composition comprising 40 vol % or more of a matrix resin, 10 to 55 vol % of a thermally conductive filler comprising at least a copper powder and graphite powder and dispersed in the matrix resin and the balance of a low-melting point alloy connecting the thermally conductive filler to each other and having a melting point not higher than 500° C., the proportion of the volume ratio of the low-melting point alloy to that of the thermally conductive filler being in a range from 1/30 to 3/1.

13. The casing according to claim 12, wherein the casing has a thermal conductivity of 5 W/m·K or higher.

* * * * *